US012800048B2

(12) United States Patent
Ahn et al.

(10) Patent No.: US 12,800,048 B2
(45) Date of Patent: Nov. 17, 2026

(54) RECIRCULATION VALVE

(71) Applicant: KYUNGDONG NAVIEN CO., LTD., Gyeonggi-do (KR)

(72) Inventors: Hee Su Ahn, Seoul (KR); Su Dae Park, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 162 days.

(21) Appl. No.: 18/725,160

(22) PCT Filed: Aug. 17, 2022

(86) PCT No.: PCT/KR2022/012266
§ 371 (c)(1),
(2) Date: Dec. 3, 2024

(87) PCT Pub. No.: WO2023/128118
PCT Pub. Date: Jul. 6, 2023

(65) Prior Publication Data

US 2025/0334197 A1 Oct. 30, 2025

(30) Foreign Application Priority Data

Dec. 30, 2021 (KR) ........................ 10-2021-0193051

(51) Int. Cl.
*F16K 27/02* (2006.01)
*F24D 17/00* (2022.01)
(Continued)

(52) U.S. Cl.
CPC ...... *F16K 27/0263* (2013.01); *F24D 17/0078* (2013.01); *F24D 19/1051* (2013.01); *F16K 17/048* (2013.01); *F24D 2220/0242* (2013.01)

(58) Field of Classification Search
CPC ........ F16K 27/0263; F16K 27/02; F16K 1/36; F16K 1/34; F16K 31/12; F16K 31/1223;
(Continued)

(56) References Cited

U.S. PATENT DOCUMENTS 6,772,958 B1 * 8/2004 Lamb .................. G05D 23/022 236/100
7,475,703 B2 * 1/2009 Kempf .................... E03B 1/048 137/359
(Continued)

FOREIGN PATENT DOCUMENTS

CN 112128431 A 12/2020
KR 10-0589479 B1 6/2006
(Continued)

OTHER PUBLICATIONS

Korean Patent Office, Notification of First Office Action for corresponding application No. 10-2021-0193051, issued on Aug. 14, 2024, Korea, 5 pages.
(Continued)

*Primary Examiner* — Craig J Price
(74) *Attorney, Agent, or Firm* — McDonald Hopkins LLC

(57) ABSTRACT

A recirculation valve having a warm-water housing communicating with a warm-water supply tube for supplying warm water generated by heating raw water, thereby forming a warm-water channel provided such that warm water flows through the inside thereof; a direct-water housing communicating with a direct-water supply tube through which direct water/raw water is supplied, thereby forming a direct-water channel provided such that direct water flows through the inside thereof; a recirculation housing through which the warm-water channel and the direct-water channel communicate with each other, thereby forming a recirculation channel provided such that warm water in the warm-water channel flows to the direct-water channel; and a
(Continued)

water-pressure opening/closing body provided inside the direct-water housing to be able to move according to a reference direction in order to close or open the recirculation channel.

14 Claims, 6 Drawing Sheets

(51) Int. Cl.
*F24D 19/10* (2006.01)
*F16K 17/04* (2006.01)

(58) Field of Classification Search
CPC .. F16K 31/1221; F16K 31/1226; F16K 11/04; F16K 31/002; F16K 19/003; F16K 19/006; F16K 17/003; F16K 17/0473; F16K 17/048; F24D 19/1051; F24D 17/0078; F24D 2220/0242; E03B 7/045; F24H 15/36; F24H 15/238; F24H 15/215; Y10T 137/6497
USPC ................... 137/337, 613, 528–543.23, 597; 236/100, 12.13, 12.18, 93 A, 12.17, 236/12.16, 12.23, 12.11, 101 R, 12, 17
See application file for complete search history.

(56) References Cited

U.S. PATENT DOCUMENTS

| | | | | |
|---|---|---|---|---|
| 7,744,007 | B2 * | 6/2010 | Beagen | G05D 23/134 236/12.12 |
| 7,874,498 | B2 * | 1/2011 | Kempf | G05D 23/022 236/12.13 |
| 8,434,510 | B2 * | 5/2013 | Lum | F16K 31/002 236/100 |
| 9,027,844 | B2 * | 5/2015 | Laing | F24D 17/0078 236/12.21 |
| 11,149,870 | B2 | 10/2021 | Son et al. | |
| 2005/0150548 | A1 | 7/2005 | Toshio et al. | |
| 2013/0240053 | A1 | 9/2013 | Lum et al. | |
| 2019/0040987 | A1 | 2/2019 | Wong et al. | |

FOREIGN PATENT DOCUMENTS

| | | |
|---|---|---|
| KR | 10-2096797 B1 | 5/2020 |
| KR | 10-2021-0053832 A | 5/2021 |

OTHER PUBLICATIONS

Patent Cooperation Treaty (PCT), International Search Report for Application PCT/KR2022/012266 filed on Aug. 17, 2022, mailed Nov. 15, 2022, International Searching Authority, KR.

* cited by examiner

RECIRCULATION VALVE

TECHNICAL FIELD

The present disclosure relates to a warm-water recirculation valve.

BACKGROUND ART

To always supply warm water at a temperature of a specific temperature or more, a warm-water recirculation system may be implemented. In a warm-water recirculation system, even when warm water is not discharged because use of warm water is stopped, the warm water discharged from a boiler may be returned to the boiler through a direct-water tube and reheated. As the warm water circulates so that this process is repeated, the warm water may be maintained at a specific temperature.

However, because direct-water tubes are used for recirculation of warm water, the warm water has to be prevented from being introduced into direct-water tubes when direct water is used in a source-of-demand. Additionally, even when the warm water is used in the source-of-demand, the warm water has to be supplied and discharged to a source-of-demand rather than circulating.

Accordingly, a recirculation valve that prevents the warm water from circulating when direct water or warm water is used and circulates the warm water when the direct water or the warm water is not used is needed in the warm-water recirculation system.

The recirculation valve may be disposed on a lower side of a faucet or the like to constitute a warm water recirculation system. However, because a sufficient space is not provided on a lower side of the faucet or it is difficult to install the recirculation valve, it may be difficult to constitute a warm-water recirculation system and may have a negative effect on aesthetics.

Technical Problem

The present disclosure has been designed to solve these problems, and provides a recirculation valve that may save space.

Technical Solution

According to an aspect of the present disclosure, a recirculation valve includes a warm-water housing communicating with a warm-water supply tube that supplies warm water generated by heating raw water, and defining a warm-water channel configured such that the warm water flows through an interior thereof, a direct-water housing communicating with a direct-water supply tube that supplies direct water being the raw water, and defining a direct-water channel configured such that the direct water flows through an interior thereof, a recirculation housing communicating with the warm-water channel and the direct-water channel, and defining a recirculation channel configured such that the warm water in the warm-water channel flows to the direct-water channel, and a water-pressure opening/closing body that is movable in the direct-water housing along a reference direction to close or open the recirculation channel, the water-pressure opening/closing body includes an upstream pressurizing part, and a downstream pressurizing part located in a reference direction of the upstream pressurizing part when a direction, in which the direct water is introduced from the direct-water supply tube into the direct-water channel, is defined as the reference direction, an inner surface of the direct-water housing, which defines the direct-water channel, includes an upstream inner surface located on an outside of the upstream pressurizing part when being disposed in a position, in which the water-pressure opening/closing body opens the recirculation channel, and a downstream inner surface located in the reference direction of the upstream inner surface, and a stepped portion corresponding to a stepped portion formed between the upstream pressurizing part and the downstream pressurizing part is formed between the upstream inner surface and the downstream inner surface.

Advantageous Effects

Accordingly, the recirculation of the warm water may be done efficiently even through a small recirculation valve while saving space.

MODE FOR INVENTION

Figure 1:
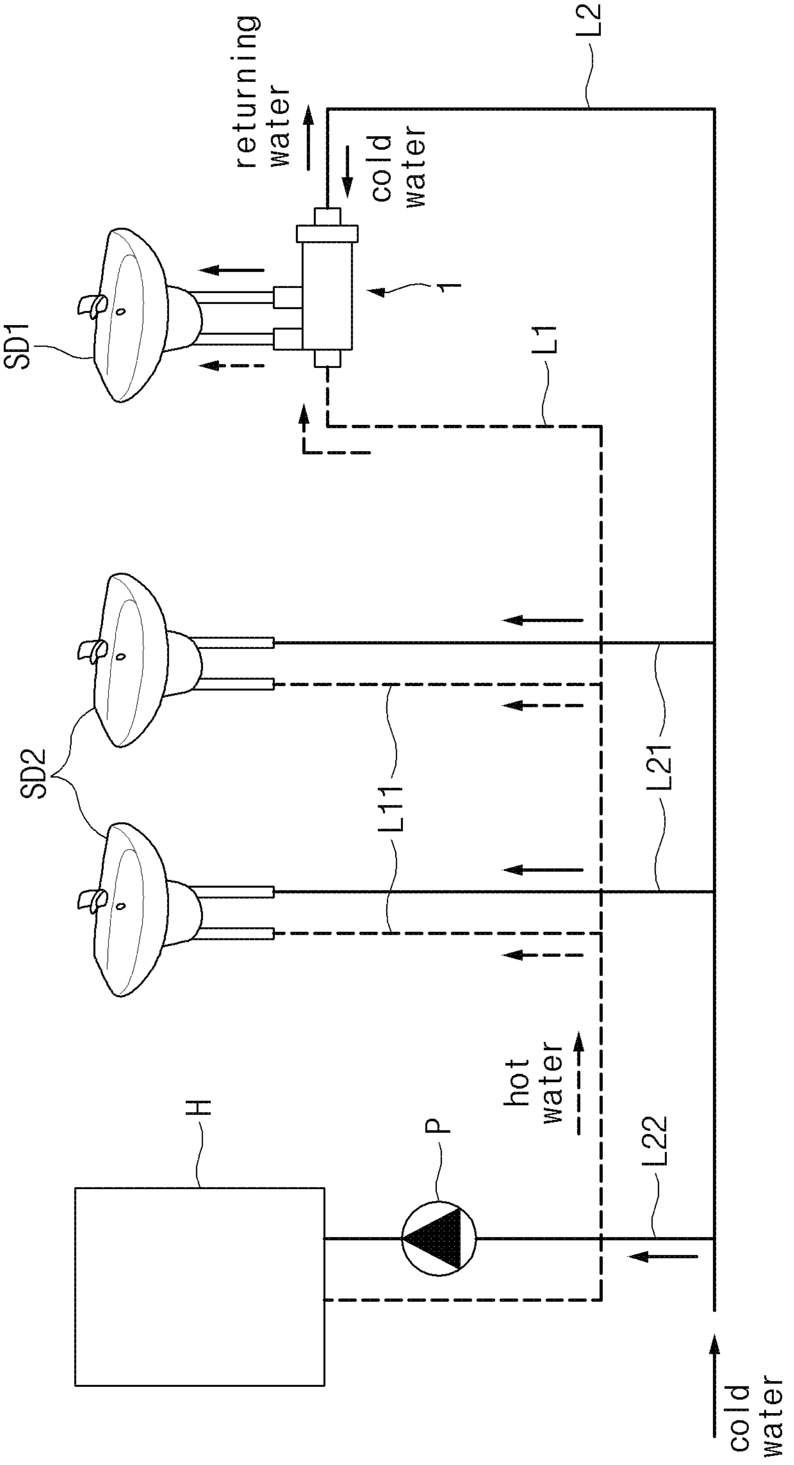
FIG. 1 is a conceptual view of a warm-water recirculation system using a recirculation valve according to an embodiment of the present disclosure.

This application claims the benefit of priority to Korean Patent Application No. 10-2021-0193051, filed in the Korean Intellectual Property Office on Dec. 30, 2021, the entire contents of which are incorporated herein by reference.

Hereinafter, embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof will be omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. When it is described that a certain component is "connected to", "coupled to" or "electrically connected to" a second component, it should be understood that the component may be directly connected or electrically connected to the second component, but a third component may be "connected" or "electrically connected" between the components.

FIG. 1 is a conceptual view of a warm-water recirculation system "S" using a recirculation valve 1 according to an embodiment of the present disclosure.

Referring to FIG. 1, the warm-water recirculation system "S" using the recirculation valve 1 according to an embodiment of the present disclosure includes a heat source "H", a recirculation valve 1, a warm-water supply tube L1, a direct-water supply tube L2, and a recirculation tube L22.

The heat source "H" is a component that forms warm water by heating direct water or returned water that is introduced raw water. Accordingly, a boiler including a heat exchanger that heats direct water by using at least one of sensible heat and latent heat of combustion gas through combustion of a fuel may be disposed as the heat source "H". However, another device may be disposed instead of the boiler and used as a heat source "H" as long as it is a device that may receive direct water or returned water and heat it to form warm water and then export it.

The heat source "H" is operated when a temperature of the introduced water is less than a specific temperature or a flow rate of the introduced water is less than an operation flow rate so that the introduced water may be heated to form warm water and then discharge it. Accordingly, an operation of the heat source "H" may be controlled by adjusting the flow rate. For this operation, a flow sensor (not illustrated) that may measure the flow rate may be disposed in the heat source "H", and a controller (not illustrated) including a microprocessor or the like that may operate the heat source "H" according to an electrical signal generated by a flow sensor may be further provided.

A recirculation tube L22 is connected to the heat source "H" so that the direct water or the returned water that is the raw water delivered from a direct-water supply tube L2 may be introduced. The direct water or returned water is called raw water, and the raw water is heated by the heat source "H" and discharged as warm water. A warm-water supply tube L1 is connected to the heat source "H", and the warm water is discharged through the warm-water supply tube L1.

The warm-water supply tube L1 is a component that is connected to the heat source "H" and supplies the warm water to a source-of-demand SD1, and one end thereof is connected to the heat source "H", and an opposite end thereof is connected to the source-of-demand SD1 after passing through the recirculation valve 1. Accordingly, the warm-water supply tube L1 serves to deliver the warm water from the heat source "H" to the source-of-demand SD1. The warm-water supply tube L1 may come out of the heat source "H", pass through the recirculation valve 1, and be connected to the source-of-demand SD1, or may be directly connected to other sources-of-demand SD2 through the other warm-water supply tube L11 branched from the warm-water supply tube L1 to supply the warm water to each of the sources-of-demand SD1 and other sources-of-demand SD2.

The source-of-demand SD1 and other sources-of-demand SD2 may be faucets that may discharge the warm water and the direct water to an outside and control a degree of discharge, as illustrated, but the present disclosure is not limited thereto.

The direct-water supply tube L2 is a component that is connected to a direct-water source and supplies the direct water to each of sources-of-demand SD1. One end of the direct-water supply tube L2 may be connected to an external direct-water source that supplies the direct water to receive the direct water and cause it to flow, or may be directly connected to another source-of-demand SD2 through another direct-water supply tube L21 branched from the direct-water supply tube L2 to supply the direct water. As illustrated, the direct-water supply tube L2 may pass through the recirculation valve 1 before being connected to the source-of-demand SD1.

The recirculation tube L22 is a component that is connected to the direct-water supply tube L2 and cause the direct water to flow from the direct-water source to the heat source "H" or causes the returned water delivered to the direct-water supply tube L2 to flow to the heat source "H" through a recirculation channel formed in a housing of the recirculation valve 1, which will be described later. Accordingly, the recirculation tube L22 may directly or indirectly connect the direct-water source and the heat source "H" so that the direct water is delivered to the heat source "H". Additionally, it may be generated in the recirculation channel and delivered to the heat source "H" through the direct-water supply tube L2. That is, it is a component that delivers water to the heat source "H".

As illustrated, with respect to a direction, in which the direct water flows from the direct-water supply tube L2, one end of the recirculation tube L22 is connected to a point in the direct-water supply tube L2, which is located on an upstream side of a point, at which the direct-water supply tube L2 is branched, and an opposite end of the recirculation tube L22 is connected to the heat source "H". Accordingly, the returned water that flows in an opposite direction to a direction, in which the direct water flows, and returns to the above-described point, and the direct water that flows to a downstream side from the direct-water source and is delivered to the above point may be delivered to the heat source "H" through the recirculation tube L22.

For the recirculation tube L22 to deliver the direct water or the returned water to the heat source "H" in this way, a pump "P" may be provided in the recirculation tube L22. The pump "P" pressurizes the direct water or the returned water that flows in the recirculation tube L22 and pumps it to the heat source "H". Accordingly, the pump "P" provides power to circulate the warm water of the entire warm-water recirculation system "S".

The recirculation valve 1 is a component that determines whether the warm water is recirculated in the warm-water recirculation system "S" according to an embodiment of the present disclosure. The recirculation valve 1 includes a recirculation channel that is connected to the warm-water supply tube L1 and the direct-water supply tube L2, and forms returned water by delivering the warm water received from the warm-water supply tube L1 to the direct-water supply tube L2. Accordingly, the warm-water recirculation system "S" is operated as follows.

The direct water is provided to the direct-water supply tube L2 from a direct-water source. A portion of the direct water is provided to another sources-of-demand SD2 through other direct-water supply tubes L21, or is delivered to the source-of-demand SD1 through the direct-water supply tube L2 and the recirculation valve 1. Another portion of the direct water is delivered to the heat source "H" through the recirculation tube L22.

The heat source "H" heats direct water to form warm water and sends it out. A portion of the warm water is discharged through the another warm-water supply tube L11 and provided to another source-of-demand SD2, or is delivered to the source-of-demand SD1 through the warm-water supply tube L1 and the recirculation valve 1. Another portion of the warm water may be provided to the direct-water supply tube L2 through the recirculation channel of the recirculation valve 1, and may be returned in an opposite direction to a direction, in which the direct water flows along the direct-water supply tube L2.

The water returned in a reverse direction along the direct-water supply tube L2 flows to the heat source "H" through the recirculation tube L22. The heat source "H" heats the returned water again to form warm water and send it out through the warm-water supply tube L1.

During the recirculation process, the recirculation valve 1 adjusts the flow rate of the recirculated warm water.

Figure 2:
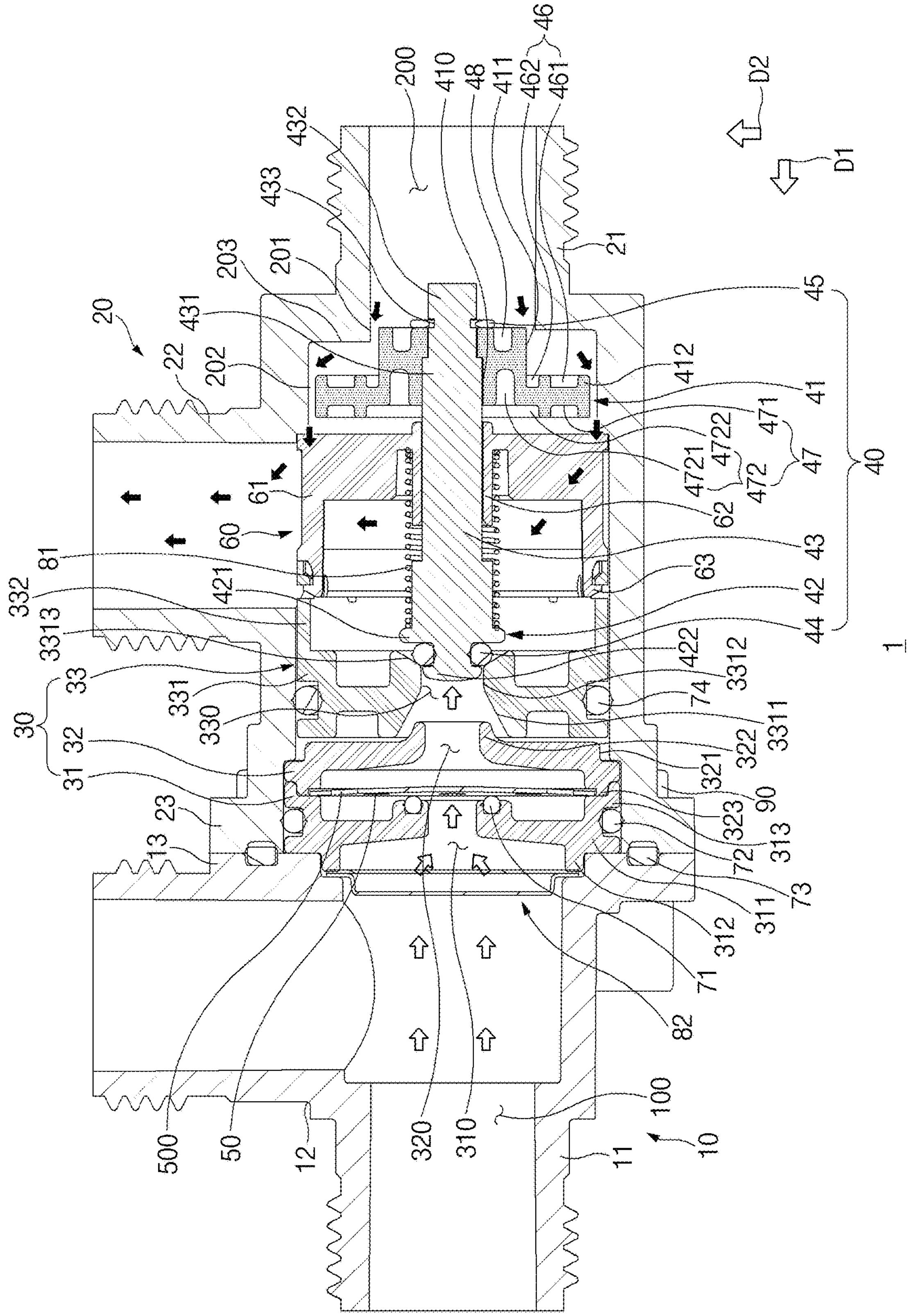
FIG. 2 is a longitudinal cross-sectional view of a recirculation valve according to an embodiment of the present disclosure.
Figure 3:
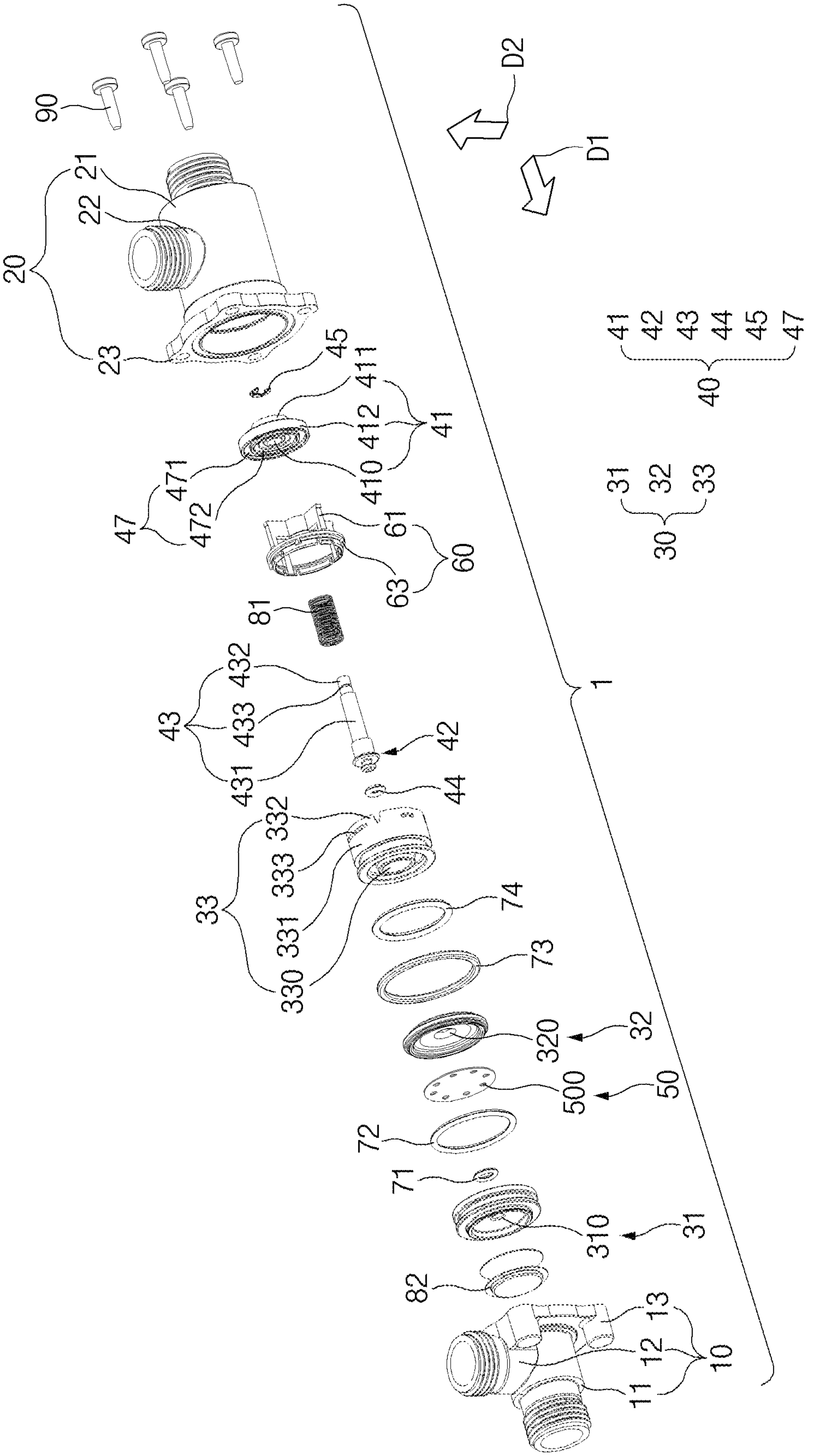
FIG. 3 is an exploded perspective view of a recirculation valve according to an embodiment of the present disclosure.

FIG. 2 is a longitudinal cross-sectional view of the recirculation valve 1 according to an embodiment of the present disclosure. FIG. 3 is an exploded perspective view of the recirculation valve 1 according to an embodiment of the present disclosure.

Referring to the drawings, the recirculation valve 1 according to an embodiment of the present disclosure includes a housing and a water-pressure opening/closing body 40.

Housing

The housing is a component that defines an external appearance of the recirculation valve 1. The housing may include a warm-water housing 10, a direct-water housing 20, and a recirculation housing 30. An open interior of the housing may include a warm-water channel 100, a direct-water channel 200, and a recirculation channel.

The warm-water channel 100 is a channel that connects two of the openings of the warm-water housing 10, and communicates with the warm-water supply tube L1 for supplying the warm water generated by heating the raw water to the source-of-demand SD1, and the warm water flows through an interior thereof. Accordingly, the warm-water channel 100 includes a warm-water supply channel that communicates with a portion of the warm-water supply tube L1 and receives the warm water, and a warm-water discharge channel that discharges the warm water from an interior of the housing and supplies the warm water to the source-of-demand SD1 through another portion of the warm-water supply tube L1. The warm-water supply flow channel and the warm-water discharge channel are connected to different openings, respectively.

The warm-water housing 10 is a housing that communicates with the warm-water supply tube L1 for supplying the warm water generated by heating the raw water and defines a warm-water channel 100. The warm-water housing 10 may include a warm-water supply housing 11 that defines a warm-water supply channel, and a warm-water discharge housing 12 that defines a warm-water discharge channel.

As illustrated, extension directions of the warm-water supply channel and the warm-water discharge channel may not be aligned on the same straight line. Furthermore, when a direction, in which the gravity acts on an object, is defined as a vertical direction, the warm-water discharge channel may be located on an upper side of the warm-water supply channel in the vertical direction. The warm-water discharge channel may extend along the vertical direction. The warm-water supply channel may extend along a horizontal direction.

The recirculation channel communicates with the warm-water channel 100. Accordingly, a portion of the warm water provided through the warm-water supply channel, may be delivered to the warm-water discharge channel, and the remaining portions thereof may flow to the recirculation channel in an area, in which a front cover is disposed, and may enter the recirculation process.

The direct-water channel 200 is a channel that communicates with the direct-water supply tube L2 for supplying the direct water that is the raw water to the source-of-demand SD1, and in which the direct water flows through an interior thereof. The direct-water channel 200 includes a direct-water supply channel that supplies the direct water to the interior of the housing and discharges the warm water introduced along a recirculation channel, which will be described later, to an outside of the housing for recirculation, and a direct-water discharge channel that discharges the direct water to the outside of the housing. Furthermore, the direct-water channel 200 includes a middle direct-water channel that connects the direct-water supply channel and the direct-water discharge channel, communicates with the recirculation channel, and accommodates the water-pressure opening/closing body 40, which will be described later, in an interior thereof. Accordingly, the direct water is delivered from the direct-water supply channel to the direct-water discharge channel through the middle direct-water channel and is delivered to the source-of-demand SD1.

The direct-water housing 20 is a housing that communicates with the direct-water supply tube L2 that supplies the direct water that is the raw water and defines a direct-water channel 200. The direct-water housing 20 may include a direct-water supply housing 21 that defines a direct-water supply channel, and a direct-water discharge housing 22 that defines a direct-water discharge channel. A middle direct-water channel may be formed in a position, in which the direct-water supply housing 21 and the direct-water discharge housing 22 meet each other.

The direct-water supply channel and the direct-water discharge channel are spaced apart from each other along an extension direction of the middle direct-water channel, and communicate with the middle direct-water channel. Accordingly, the direct water that is disposed not to meet each other and flows in the direct-water supply channel is not delivered directly to the direct-water discharge channel while neither passing through the middle direct-water channel nor being hindered by the water-pressure opening/closing body 40 that the middle direct-water channel accommodates. The direct water that flows in the direct-water supply channel is delivered to the direct-water discharge channel through the middle direct-water channel.

Assume that a direction, in which the direct water is introduced through the direct-water supply channel, is a reference direction D1, and a direction, in which the direct water is discharged through the direct-water discharge channel, is a discharge direction D2. A direction, in which the warm water is introduced through the warm-water supply channel, may be an opposite direction to the reference direction D1, and a direction, in which the warm water is discharged through the warm-water discharge channel, may be parallel to the discharge direction D2. The discharge direction D2 and the reference direction D1 may be perpendicular to each other.

As illustrated, the extension directions of the direct-water supply channel and direct-water discharge channel may not be aligned on the same straight line. Furthermore, the direct-water discharge channel may be located on an upper side of the direct-water supply channel in the vertical direction. The direct-water discharge channel may extend along the vertical direction. The direct-water supply channel may extend along the horizontal direction.

The middle direct-water channel may communicate with the recirculation channel. Accordingly, the warm water is delivered from the warm-water channel 100 to the middle direct-water channel through the recirculation channel, and the warm water delivered in this way naturally flows to the direct-water supply channel, flows in an opposite direction to a direction, in which the direct water flows, and becomes returned water.

The direct-water housing 20 and the warm-water housing 10 may be fastened by using a fastening member 90. The direct-water housing 20 may have a direct-water flange 23, to which the fastening member 90 may be fastened, and that is connected to the direct-water introduction housing. The warm-water housing 10 may have a warm-water flange 13, to which the fastening member 90 may be fastened, and that is connected to the warm-water inlet housing. The direct-water housing 20 and the warm-water housing 10 may be coupled to each other while the fastening member 90 passes through fastening holes that are formed in the direct-water flange 23 and the warm-water flange 13, respectively, in a state, in which they contact each other. The fastening member 90 may be a bolt, may be plural, and may be coupled to the direct-water flange 23 and the warm-water flange 13 along the reference direction D1 or an opposite direction thereto.

A recirculation channel may be formed in a position, in which the direct-water housing 20 and the warm-water housing 10 meet each other. That is, the recirculation channel may be formed at a portion that is surrounded by the direct-water flange 23 and the warm-water flange 13. The recirculation housing 30 may be disposed in a space that is defined by the direct-water flange 23 and the warm-water flange 13.

To maintain the watertightness of the recirculation channel, an annular housing packing 73 may be disposed at a boundary of the direct-water flange 23 and the warm-water flange 13. The housing packing 73 may be formed of an elastic material.

An inner surface of the direct-water housing 20, which defines the direct-water channel 200, may include an upstream inner surface 201, a downstream inner surface 202, and a stepped portion inner surface 203. The upstream inner surface 201 is a side surface that is located on an outside of the upstream pressurizing part 411 when the water-pressure opening/closing body 40 is disposed in a position for opening the recirculation channel, and the downstream inner surface 202 is an inner surface that is located in the reference direction D1 of the upstream inner surface 201. The stepped portion inner surface 203 may be formed between the upstream inner surface 201 and the downstream inner surface 202 while facing the reference direction D1. The upstream inner surface 201 and the downstream inner surface 202 may face a direction that is perpendicular to the stepped portion inner surface 203. A stepped portion corresponding to a stepped portion formed between the upstream pressurizing part 411 and a downstream pressurizing part 412, which will be described later, may be formed between the upstream inner surface 201 and the downstream inner surface 202. The inner surface shape may increase a load of the direct water on the downstream pressurizing part 412, together with a shape of the pressurizing part 41, which will be described later. Accordingly, even with a small-sized valve, a sufficient direct water load may be secured without having to make the pressurizing part very large to apply a sufficient load.

The recirculation channel is a channel that communicates the warm-water channel 100 and the direct-water channel 200 to cause the warm water in the warm-water channel 100 to flow to the direct-water channel 200. The recirculation channel may be defined by the recirculation housing 30. A bimetal plate 50 may be disposed in the recirculation channel. Like the middle direct-water channel, the recirculation channel may be formed to be opened along a horizontal reference direction D1 that is perpendicular to the vertical direction. The recirculation channel may be defined by an introduction opening 310, a middle opening 320, and a discharge opening 330.

The recirculation housing 30 may include bimetal cases 31 and 32 and an opening/closing case 33. The bimetal cases 31 and 32 may include an upstream bimetal case 31, and a downstream bimetal case 32 that is located on a downstream side of the upstream bimetal case 31 with respect to a flow direction of the warm water in the recirculation channel. The bimetal cases 31 and 32 and the opening/closing case 33 may be located adjacent to each other to define a recirculation channel that passes through the recirculation housing 30 along the reference direction D1. The bimetal cases 31 and 32 may be interposed between the direct-water housing 20 and the warm-water housing 10, and an opening/closing case 33 may be located in a side of the bimetal cases 31 and 32 in an opposite direction to the reference direction D1. The opening/closing case 33 may be interposed between the bimetal cases 31 and 32 and the direct-water housing 20. An upstream bimetal case 31 may be interposed between the downstream bimetal case 32 and the warm-water housing 10. A downstream bimetal case 32 may be interposed between the upstream bimetal case 31 and the direct-water housing 20.

A discharge section of the recirculation channel, which is one section that is located adjacent to the water-pressure opening/closing body 40, may be a section that is defined by the opening/closing case 33. The discharge section may have a shape, of which a cross-sectional area taken along a plane that is perpendicular to the reference direction D1 increases as it goes along the reference direction D1.

The upstream bimetal case 31 may include an upstream case body 311. The upstream case body 311 is formed in a ring shape to define the introduction opening 310. The recirculation valve 1 according to an embodiment of the present disclosure may include a case packing 72 that is disposed in a groove formed on a radially outer surface of the upstream case body 311 to maintain a watertightness of a boundary between outer surfaces of the bimetal cases 31 and 32 and an inner surface of the warm-water housing 10. The case packing 72 may have an annular shape, and may be formed of an elastic material.

A side surface of the upstream case body 311 in the reference direction D1 may have a profile that is inclined radially outward with respect to the reference direction D1. A radially inner end of the upstream case body 311 may have a shape that protrudes in an opposite direction to the reference direction D1. The introduction opening 310 may be surrounded and defined by the radially inner end of the upstream case body 311.

The recirculation valve 1 according to an embodiment of the present disclosure may include a filter net 82. The filter net 82 may filter out foreign substances contained in the warm water delivered to the recirculation channel.

The filter net 82 may include a porous net to filter out the foreign substances. Two nets that constitute the filter net 82 may be provided, and the two nets may be disposed such that central portions thereof are spaced apart from each other along a leftward and rightward direction. A circumference of the filter net 82 may be interposed and fixed between the upstream bimetal case 31 and the warm-water housing 10. The filter net 82 may be located on an upstream side of the introduction opening 310 along a flow direction of the warm water.

The recirculation valve 1 according to an embodiment of the present disclosure may include a bimetal packing 71 that may contact the bimetal plate 50 when a center of the bimetal plate 50 is deformed to be moved toward a radially inner end of the upstream case body 311 to close the introduction opening 310. The bimetal packing 71 may be inserted into a groove that is formed on an opposite side to the radially inner end of the upstream case body 311 in the reference direction D1. The bimetal packing 71 may have an annular shape, and may be formed of an elastic material. The bimetal packing 71 may contact the bimetal plate 50 to maintain a watertightness of a boundary between the upstream case body 311 and the bimetal plate 50. Accordingly, even when the bimetal plate 50 covers and blocks the introduction opening 310, it may absorb an impact and maintain the watertightness.

The upstream bimetal case 31 may include an upstream case reference protrusion 312 that protrudes from the upstream case body 311 along the reference direction D1. The upstream case reference protrusion 312 may have an annular shape.

The upstream bimetal case 31 may include an upstream case opposite protrusion 313 that protrudes from the upstream case body 311 along the opposite direction to the reference direction D1. The upstream case opposite protrusion 313 may have an annular shape. The upstream case opposite protrusion 313 may surround a downstream case reference protrusion 323 that will be described later, and the downstream case reference protrusion 323 may be inserted into a space defined by the upstream case opposite protrusion 313 so that the upstream bimetal case 31 and the downstream bimetal case 32 are coupled to each other.

The downstream bimetal case 32 may include a downstream case body 321. The downstream case body 321 may have an annular shape and define a middle opening 320. A side surface of the downstream case body 321 in the reference direction D1 may have a profile that is inclined radially outward with respect to the reference direction D1. The radially inner end 322 of the downstream case body 321 may have a shape that protrudes in the opposite direction to the reference direction D1. The middle opening 320 may be defined while being surrounded by the radially inner end 322 of the downstream case body 321. The middle opening 320 may be located on a downstream side of the introduction opening 310 with respect to a flow direction of the warm water in the recirculation channel.

The downstream bimetal case 32 may include a downstream case reference protrusion 323 that protrudes from the downstream case body 321 along the reference direction D1. The downstream case reference protrusion 323 may have an annular shape.

The opening/closing case 33 may include an opening/closing body 331 that surrounds and defines the discharge opening 330. An inner surface of the opening/closing body 331 may define the discharge opening 330 that is a downstream portion of the recirculation channel with respect to a direction, in which the warm water flows in the recirculation channel.

The inner surface of the opening/closing body 331 may include a first opening/closing inner surface 3311, a second opening/closing inner surface 3312, and a third opening/closing inner surface 3313. The second opening/closing inner surface 3312 may be disposed on a downstream side of the first opening/closing inner surface 3311, and the third opening/closing inner surface 3313 may be disposed on a downstream side of the second opening/closing inner surface 3312. The first opening/closing inner surface 3311 may have a shape, of which a cross-sectional area taken along a plane that is perpendicular to the reference direction D1 increases as it goes in the reference direction D1. The second opening/closing inner surface 3312 may have a shape, of which a cross-sectional area taken along a plane that is perpendicular to the reference direction D1 is maintained as it goes in the reference direction D1. The third opening/closing inner surface 3313 may have a shape, of which a cross-sectional area taken along a plane that is perpendicular to the reference direction D1 decreases as it goes in the reference direction D1. The water-pressure packing 44 of the water-pressure opening/closing body 40, which will be described later, may contact the third opening/closing inner surface 3313 and thus, may close the discharge opening 330.

A section that is defined by the first opening/closing inner surface 3311 may be the above-described discharge section. A degree, by which the first opening/closing inner surface 3311 is inclined with respect to the reference direction D1, may be less than a degree, by which the third opening/closing inner surface 3313 is inclined with respect to the reference direction D1. Because this tapered discharge section is defined by the first opening/closing inner surface 3311, the water-pressure opening/closing body 40 may guide the warm water to a portion that blocks the discharge opening 330.

A groove that is recessed radially inward is formed on the radially outer surface of the opening/closing body 331, an opening/closing packing 74 for maintaining the watertightness of a boundary between the opening/closing body 331 and the inner surface of the direct-water housing 20 may be inserted thereinto. The opening/closing packing 74 may have an annular shape and may be formed of an elastic material.

The opening/closing case 33 may include an opening/closing protrusion 332. The opening/closing protrusion 332 may be formed to protrude from a side surface of the opening/closing body 331 in an opposite direction to the reference direction D1, in the opposite direction to the reference direction D1. The opening/closing protrusion 332 have an annular shape, and may surround the water-pressure opening/closing body 40. The opening/closing protrusion 332 may extend along a circumferential direction thereof and be opened along a radial direction thereof to define a stop opening 333. A stop portion 63 included in a fixing frame 60, which will be described later, may be inserted into the stop opening 333 to be stopped so that the fixing frame 60 and the opening/closing case 33 may be coupled to each other. The stop portion 63 has an inclined surface, of which a cross-sectional area taken along a plane that is perpendicular to the reference direction D1 decreases as it goes in the reference direction D1, on a radially outer side, and thus, may be coupled to the stop opening 333 through snap fitting while being inserted into the opening/closing protrusion 332 along the reference direction D1.

Water-Pressure Opening/Closing Body 40

Figure 4:
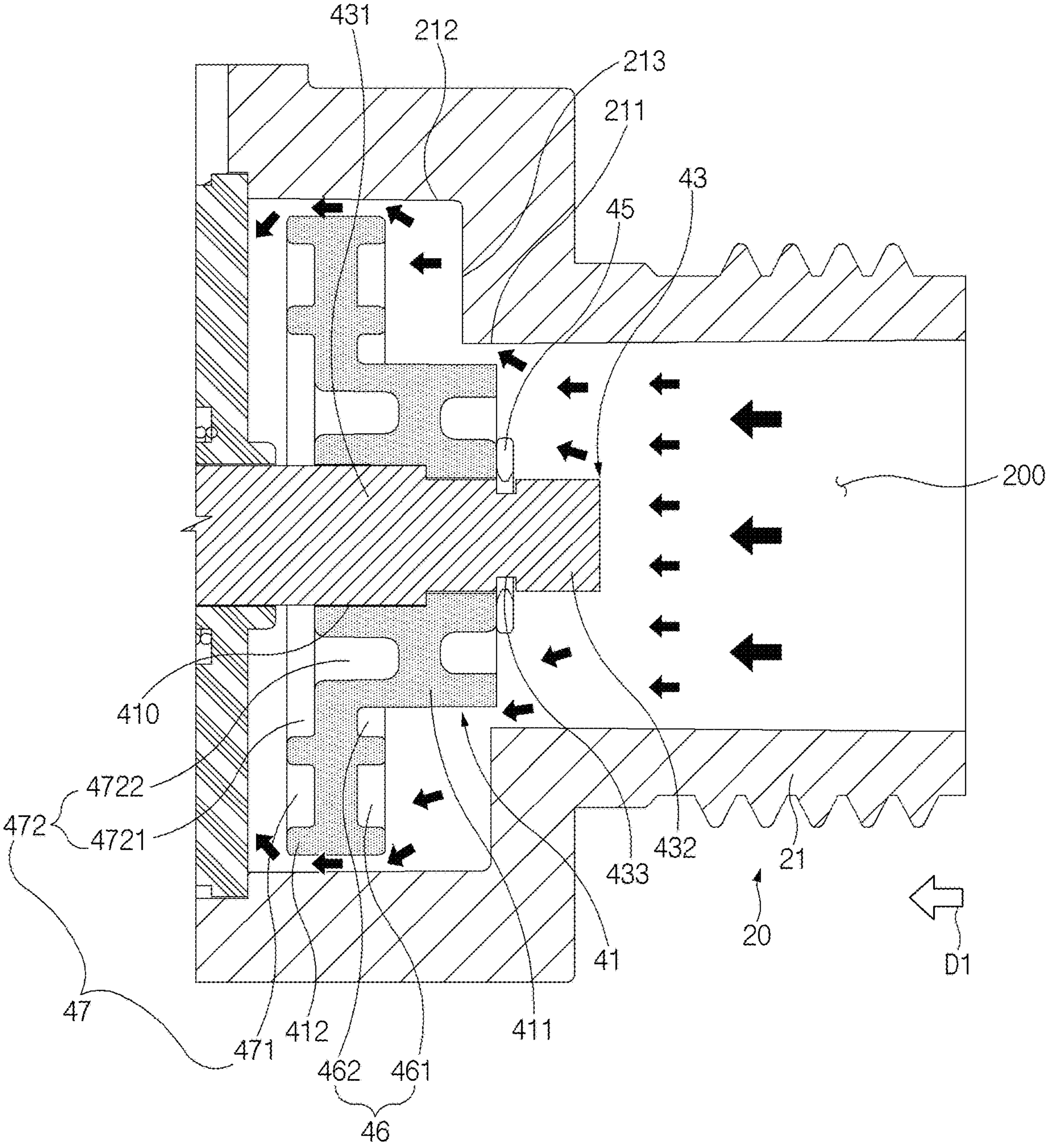
FIGS. 4 and 5 are detailed cross-sectional views of a pressurizing part and adjacent parts of a water-pressure opening/closing body according to an embodiment of the present disclosure.
Figure 5:
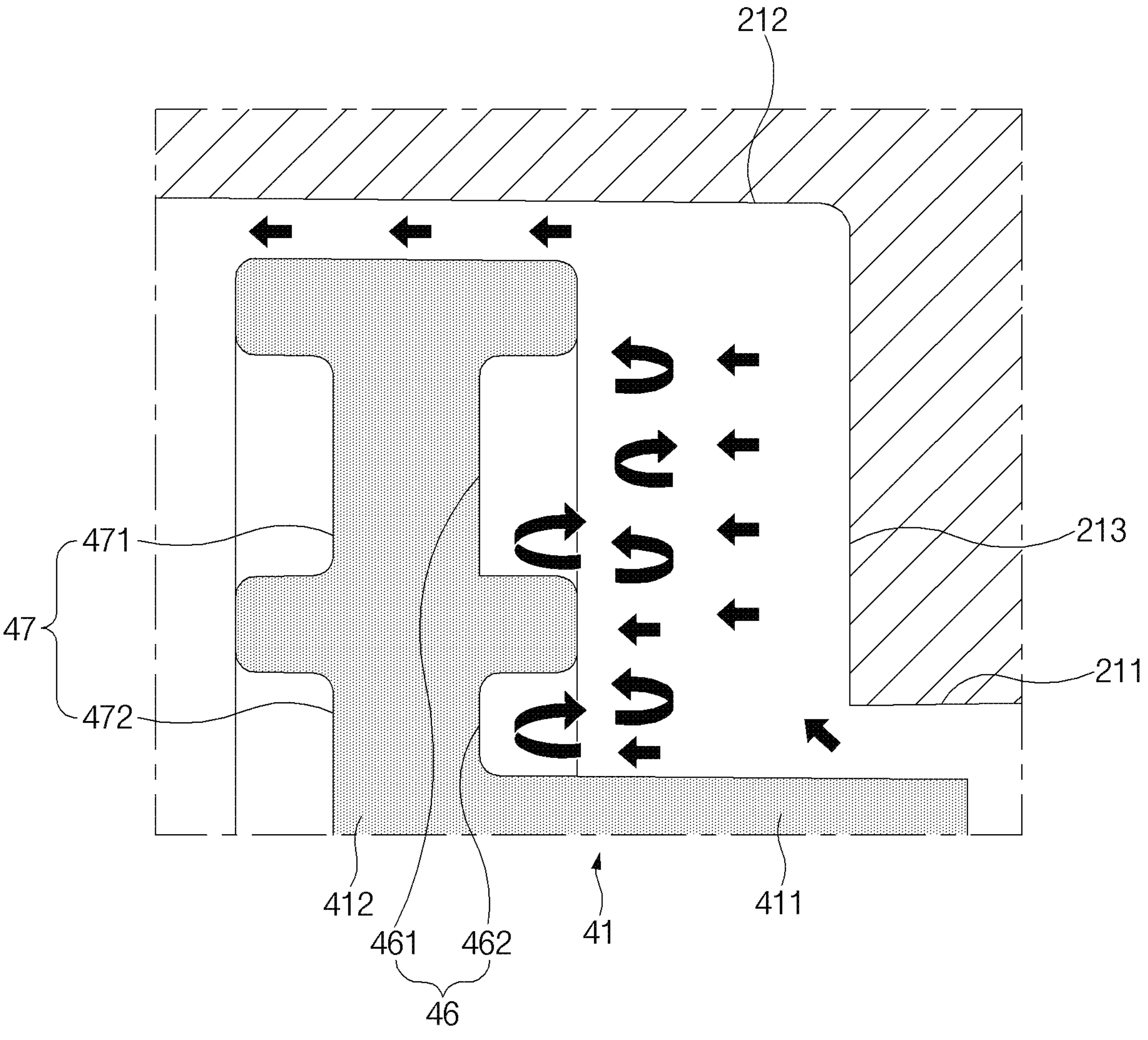

FIGS. 4 and 5 are detailed views of cross-sections of a portion of the water-pressure opening/closing body 40, which is adjacent to the pressurizing part 41, according to an embodiment of the present disclosure.

The water-pressure opening/closing body 40 is a component that is configured to close or open the recirculation channel. The water-pressure opening/closing body 40 may be accommodated in the middle direct-water channel, and may be moved along the reference direction D1 and an opposite direction thereto. The water-pressure opening/closing body 40 is moved to close the recirculation channel when the direct water or the warm water is used, and is moved in an opposite direction to a direction, it is moved in an opposite direction to a direction, in which it is moved when the direct water or the warm water is used to opens the recirculation channel when the direct water or the warm water is not used. A direction, in which the water-pressure opening/closing body 40 is moved when the direct water or the warm water is used, may be the reference direction D1, and a direction, it is moved when the direct water and the warm water are not used, may be the opposite direction to the reference direction D1.

A pressure of the direct water of the direct-water source that supplies the direct water is higher than an internal pressure of the warm-water channel 100. Accordingly, even though only the direct water is used and an internal pressure of the direct-water channel 200 is slightly lowered, it is higher than the internal pressure of the warm-water channel 100 so that the water-pressure opening/closing body 40 may be pressed in the opposite direction to the reference direction D1 by the direct water, and thus, the recirculation channel may be maintained in a closed state. Even when only the warm water is used, the internal pressure of the direct-water channel 200, which does not allow the direct water to be discharged, is higher than the internal pressure of the warm-water channel 100 that is slightly lowered as the warm water is discharged although it is pressed by the pump "P". Accordingly, the water-pressure opening/closing body 40 is pressed in the opposite direction to the reference direction D1 by the direct water so that the recirculation channel may be maintained in a closed state. For the same reason, even when the direct water and the warm water are used together, the recirculation channel is closed by the water-pressure opening/closing body 40.

In this way, because the recirculation channel is closed when the warm water or the direct water is used, a situation, in which the direct water and the warm water are supplied to the source-of-demand SD1 while being mixed at an unwanted water temperature, may be prevented.

The water-pressure opening/closing body 40 may include a shaft 43. The shaft 43 is a component that is a framework of the water-pressure opening/closing body 40, and may extends along the reference direction D1 and may be supported by the fixing frame 60. The shaft 43 may include an upstream shaft 432, and a downstream shaft 431 that is located on a side of the upstream shaft 432 in the reference direction D1. A diameter of the downstream shaft 431 may be larger than a diameter of the upstream shaft 432. The shaft 43 may have a cylindrical shape, but a shape thereof is not limited thereto.

The downstream shaft 431 may be recessed radially inward and may define a shaft groove 433. A pressurizing part fixing member 45 may be coupled to the shaft groove 433. The pressurizing part fixing member 45 may be a 'C' shaped C ring. The pressurizing part fixing member 45 may be coupled to the shaft 43 on an upstream side of a position, in which the pressurizing part 41 is coupled to the shaft 43, with respect to the reference direction D1. The pressurizing part 41 may be coupled to a portion on the shaft 43 including the boundary of the upstream shaft 432 and the downstream shaft 431.

The water-pressure opening/closing body 40 may include an opening approaching portion 42. The opening approaching portion 42 may be located on a side of the downstream pressurizing part 412 in the reference direction D1. The opening approaching portion 42 may be formed integrally with a distal end of the upstream shaft 43 in the reference direction D1 as illustrated, but may be formed as a separate product and may be coupled to the distal end of the upstream shaft 43 in the reference direction D1. The opening approaching portion 42 may include an approach cover 421 that is coupled to the upstream shaft 432 while covering the upstream shaft 432. The opening approaching portion 42 may include an approach protrusion 422 that protrudes from an approach cover 421 along the reference direction D1, of which a cross-sectional area taken along a plane that is perpendicular to the reference direction D1 at a distal end thereof in the reference direction D1 increases, and defines a groove, into which the water-pressure packing 44 is to be inserted, between the approach protrusion 422 and the approach cover 421. The approach protrusion 422 may be inserted into the discharge opening 330 when the recirculation channel is closed by the water-pressure opening/closing body 40. As the approach protrusion 422 is inserted into the discharge opening 330, the water-pressure packing 44 that surrounds the opening approaching portion 42 may close the recirculation channel with no significant impact while contacting the inner surface of the opening/closing case 33.

The water-pressure opening/closing body 40 may include water-pressure packing 44. The water-pressure packing 44 is coupled to the opening approaching portion 42 while surrounding the opening approaching portion 42 so as to contact the third opening/closing inner surface 3313 around the discharge opening 330 when the water-pressure opening/closing body 40 closes the recirculation channel. The water-pressure packing 44 may have an annular shape, and may be formed of an elastic material. At least one of the water-pressure packing 44 and the packings described in the specification of the present disclosure may be an O-ring.

The recirculation valve 1 according to an embodiment of the present disclosure may include an elastic member 81. One end of the elastic member 81 may be connected to the water-pressure opening/closing body 40, and an opposite end thereof may be connected to the fixing frame 60. An end of the elastic member 81 in the reference direction D1 may be coupled to the approach cover 421 of the opening approaching portion 42, an opposite end of the elastic member 81 in the reference direction D1 may be coupled to the fixing frame 60, and the elastic member 81 may support the water-pressure opening/closing body 40 with respect to the fixing frame 60 such that the water-pressure opening/closing body 40 may fluctuate. The approach cover 421 may have a distal end in the reference direction D1, which protrudes radially outward so that the elastic member 81 is prevented from deviating in the reference direction D1. The elastic member 81 may be a spiral spring, but a type thereof is not limited thereto.

The elastic member 81 may have a basic length that is neither tensioned nor compressed when the direct water or the warm water is not used. Assume that a point of an interior of the middle direct-water channel, at which the water-pressure opening/closing body 40 is located when the length of the elastic member 81 is the basic length, is a basic position. That is, the elastic member 81 has the basic length when the above-mentioned conditions are satisfied and locates the water-pressure opening/closing body 40 in the basic position. In the basic position, the water-pressure opening/closing body 40 may not close the recirculation channel.

The elastic member 81 may be tensioned by a force of the direct water pressing and moving the water-pressure opening/closing body 40 when the direct water or the warm water is used. By a hydraulic pressure of the direct water, the water-pressure opening/closing body 40 may be moved in the reference direction D1 that is a direction, in which it becomes closer to the recirculation channel, to close the recirculation channel. Then, an opposite end of the elastic member 81, one end of which is coupled to the water-pressure opening/closing body 40, is connected to the fixing frame 60 but is tensioned because the fixing frame 60 is not moved, and the elastic member 81 applies a restoring force due to elasticity to the water-pressure opening/closing body 40 in the opposite direction to the reference direction D1. Accordingly, when the direct water has been completely used and an external force that acts on the water-pressure opening/closing body 40, except for the restoring force, disappears or the remaining external forces reach an equilibrium state, the water-pressure opening/closing body 40 may return to the basic position due to the restoring force.

The water-pressure opening/closing body 40 includes a pressurizing part 41. The pressurizing part 41 is a part that is pressurized in the reference direction D1 by the introduced direct water. The pressurizing part 41 may be passed through by the shaft 43 and may be coupled to the shaft 43. The shaft 43 may be inserted into a shaft insertion hole 410 formed in the pressurizing part 41 along the reference direction D1. Accordingly, an opposite end of the shaft 43 in the reference direction D1 may be located to protrude further to an opposite side in the reference direction D1 than the pressurizing part 41. A length of the shaft 43, which protrudes in the reference direction D1 from the pressurizing part 41, may be greater than a length of the shaft 43, which protrudes in the opposite direction to the reference direction D1. The pressurizing part 41 may include an upstream pressurizing part 411 and a downstream pressurizing part 412 that is connected to the upstream pressurizing part 411. The downstream pressurizing part 412 is located in the reference direction D1 of the upstream pressurizing part 411.

A cross-sectional area of the downstream pressurizing part 412, which is taken along a plane that is perpendicular to the reference direction D1 may be smaller than a cross-sectional area of the direct-water housing 20, which is obtained from an area, in which the downstream inner surface 202 is formed. The cross-sectional area of the upstream pressurizing part 411 may be smaller than the cross-sectional area of the direct-water housing 20 obtained in the area, in which the upstream inner surface 201 is formed. Accordingly, the downstream pressurizing part 412 may be spaced radially inward apart from the downstream inner surface 202, and the upstream pressurizing part 411 may be spaced radially inward apart from the upstream inner surface 201 to define a spacing space and thus allow the direct water to flow through the spacing space.

The upstream pressurizing part 411 and the downstream pressurizing part 412 may have different cross-sectional areas taken along a plane that is perpendicular to the reference direction D1, and thus, a stepped portion may be formed at a boundary between the upstream pressurizing part 411 and the downstream pressurizing part 412. A stepped portion corresponding to the stepped portion formed between the upstream pressurizing part 411 and the downstream pressurizing part 412 may be formed between the upstream inner surface 201 and the downstream inner surface 202. The pressurizing part 41 may be formed such that a cross-sectional area of the downstream pressurizing part 412 is greater than a cross-sectional area of the upstream pressurizing part 411. Accordingly, an inner surface of the direct-water housing 20 may be formed such that the cross-sectional area of the downstream inner surface 202 is also greater than the cross-sectional area of the upstream inner surface 201. When the direct-water housing 20 is viewed in the opposite direction of the reference direction D1, a profile of the upstream inner surface 201 may be located in a profile of the downstream inner surface 202. Due to the stepped portion between the upstream pressurizing part 411 and the downstream pressurizing part 412, the direct water that primarily pressurizes the upstream pressurizing part 411 along the reference direction D1 secondarily pressurizes the downstream pressurizing part 412 along the reference direction D1 so that the pressurizing part 41 may be operated while receiving a sufficient pressurizing force through the direct water.

In a state, in which the water-pressure opening/closing body 40 opens the recirculation channel, the downstream pressurizing part 412 may be located in the reference direction D1 of the upstream inner surface 201. The downstream pressurizing part 412 may be located in the reference direction D1 of the stepped portion inner surface 203.

The water-pressure opening/closing body 40 may include a vortex forming part 46 that is formed by recessing an opposite side surface of the downstream pressurizing part 412 in the reference direction D1, along the reference direction D1. A radial inner boundary of the vortex forming part 46 may be continuous from the upstream pressurizing part 411. The vortex forming part 46 may have an annular profile when viewed along the reference direction D1. As illustrated in FIG. 5, a vortex may be formed from the introduced direct water by the vortex forming part 46. As a vortex is formed, a force applied to the downstream pressurizing part 412 by the direct water may increase.

The vortex forming part 46 may be divided into two parts. The vortex forming part 46 may include an outer vortex forming part 461 and an inner vortex forming part 462. The inner vortex forming part 462 may be formed to surround the shaft insertion hole 410, and the outer vortex forming part 461 may be located outside the inner vortex forming part 462 with respect to a radial direction of the downstream pressurizing part 412 and thus, may be formed to surround the inner vortex forming part 462 when viewed in the reference direction D1. The outer vortex forming part 461 and the inner vortex forming part 462 may be distinguished from each other.

The pressurizing part 41 may include an upstream groove 48. The upstream groove 48 may be formed by recessing an opposite side surface of the upstream pressurizing part 411 in the reference direction D1, along the reference direction D1. The upstream groove 48 may have an annular shape that surrounds the shaft insertion hole 410 when viewed along the reference direction D1.

The pressurizing part 41 may include a tapered pressurizing part 413. The tapered pressurizing part 413 may be connected to an opposite side of the upstream pressurizing part 411 in the reference direction D1. The tapered pressurizing part 413 may have a shape, of which a cross-sectional area taken along a plane that is perpendicular to the reference direction D1 increases as it goes in the reference direction D1. The tapered pressurizing part 413 may contact the pressurizing part fixing member 45. The tapered pressurizing part 413 may be coupled to the upstream shaft 432.

Figure 6:
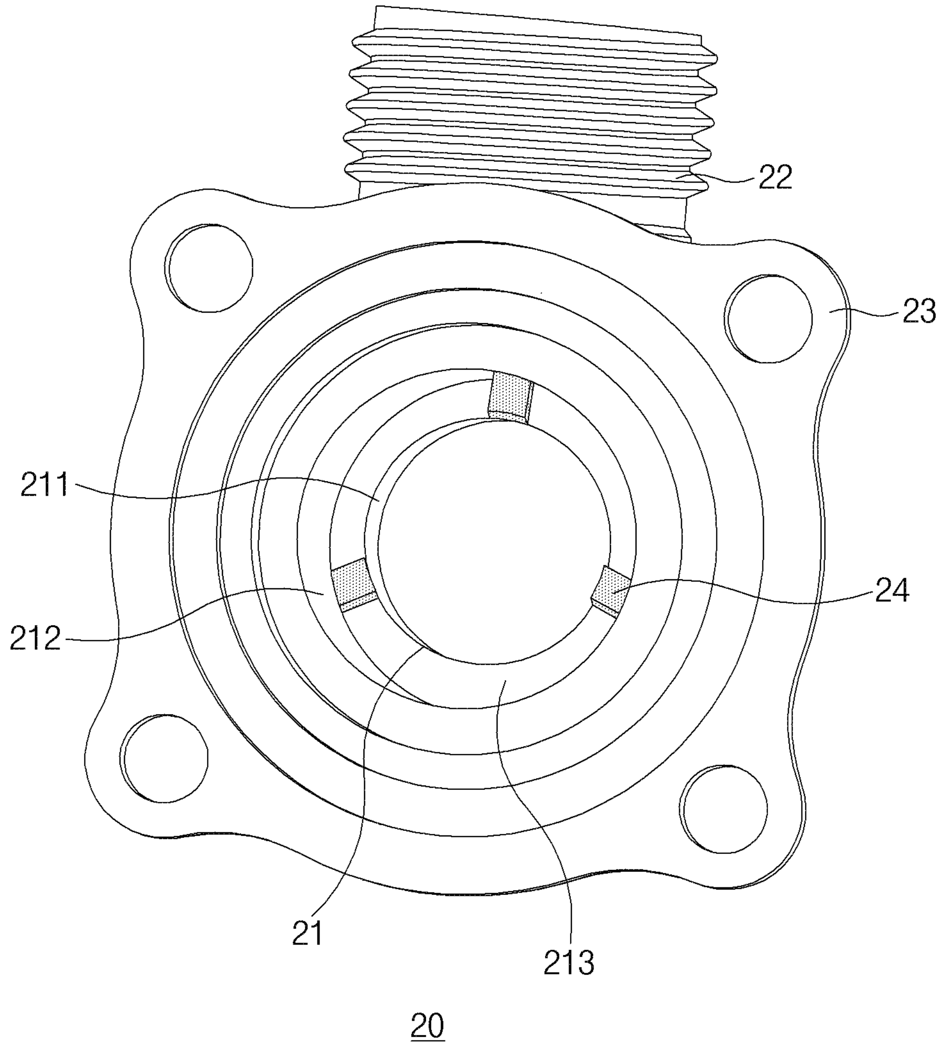
FIG. 6 is a perspective view of a direct-water housing according to an embodiment of the present disclosure.

FIG. 6 is a perspective view of the direct-water housing 20 according to an embodiment of the present disclosure.

The direct-water housing 20 may include a stopper 24 to limit the water-pressure opening/closing body 40 when it is moved in the opposite direction to the reference direction D1. The stopper 24 may be formed to protrude from the stepped portion inner surface 203 along the reference direction D1 so that the downstream pressurizing part 412 may contact it when the water-pressure opening/closing body 40 opens the recirculation channel. A plurality of stoppers 24 may be disposed to be spaced apart from each other. As the stopper 24 is disposed, the warm water flows through the recirculation channel so that the direct-water channel 200 may not be closed by the pressurizing part 41 of the water-pressure opening/closing body 40 even in a situation, in which the water-pressure opening/closing body 40 opens the recirculation channel.

The water-pressure opening/closing body 40 may include a recessed portion 47 that is formed by recessing a side surface of the downstream pressurizing part 412 of the pressurizing part 41 in the reference direction D1, in the opposite direction to the reference direction D1. The recessed portion 47 may be divided into two parts. The recessed portion 47 may include an outer recessed portion 471 and an inner recessed portion 472. The inner recessed portion 472 may be formed to surround the shaft insertion hole 410, and the outer recessed portion 471 may be located outside the inner recessed portion 472 with respect to a radial direction of the downstream pressurizing part 412 to be formed to surround the inner recessed portion 472 when viewed in the opposite direction of the reference direction D1. The outer recessed portion 471 and the inner recessed portion 472 may be distinguished from each other.

The inner recessed portion 472 may include an inner base recessed portion 4721, and an inner depth recessed portion 4722 that is formed by further recessing an opposite side surface of the inner base recessed portion 4721 to the reference direction D1, in the opposite direction to the reference direction D1.

As the recessed portion 47 is formed, the warm water collides with the recessed portion 47 to form turbulences when the warm water is recirculated, and a degree, by which the pressurizing part 41 is pressed in the opposite direction to the reference direction D1 may be stronger than when the recessed portion 47 is not present. Accordingly, the water-pressure opening/closing body 40 may easily open the recirculation channel. Because the recessed portion 47 is divided into two parts, turbulences may be formed better.

Fixing Frame 60

The recirculation valve 1 according to an embodiment of the present disclosure may include a fixing frame 60. The fixing frame 60 is a component for fixing the water-pressure opening/closing body 40 to the housing. The fixing frame 60 may be coupled to the recirculation housing 30. Because the recirculation housing 30 may be coupled to the direct-water housing 20, the fixing frame 60 may be coupled to the direct-water housing 20 through the recirculation housing 30. The fixing frame 60 may have the above-described stop portion 63 at an end of the outer frame body 61 in the reference direction D1, which will be described later, to be coupled to the recirculation housing 30 in the opposite direction of the reference direction D1. The fixing frame 60 may be located in the reference direction D1 of the downstream pressurizing part 412.

A water-pressure opening/closing body 40 may be inserted into the fixing frame 60 along the reference direction D1. The fixing frame 60 may include an outer frame body 61 and an inner frame body 62. The outer frame body 61 may contact the direct-water housing 20 and may have an annular shape when viewed along the reference direction D1. The inner frame body 62 may be located on a radially inner side of the outer frame body 61, may be connected to the outer frame body 61, and may have an annular shape when viewed along the reference direction D1. The downstream shaft 431 may be inserted into the inner frame body 62. An opposite end of the elastic member 81 in the reference direction D1 may be coupled to the inner frame body 62.

The fixing frame 60, the opening/closing case 33, and the water-pressure opening/closing body 40 have the above-described coupling relationship so that a recirculation module including them may be formed, and an assembly performance may be improved by modularized parts so that the recirculation valve 1 may be maintained and repaired easier.

Bimetal Plate 50

The bimetal plate 50 is further provided in the recirculation channel. The bimetal plate 50 may be deformed depending on the temperature of the warm water so that the recirculation channel may be opened when the temperature of the warm water is less than the reference temperature and the recirculation channel may be closed when the temperature of the warm water is the reference temperature or more. The bimetal plate 50 may open and close the introduction opening 310 that is a part of the recirculation channel.

The bimetal plate 50 may be formed of a bimetal, of which a shape is changed depending on temperature. A bimetal is a member that is formed by two metals with different thermal expansion coefficients, which contact each other, and two ends of which are coupled to each other, and depending on temperature, the two metals is prolonged or contracted at different rates, bending direction and degree thereof are changed. Accordingly, a shape of the bimetal plate 50 may change depending on a temperature of the warm water that flows in the housing of the recirculation valve 1.

In an area adjacent to a periphery of the bimetal plate 50, a plurality of bimetal holes 500 that are holes formed to be passed through by the bimetal plate 50 may be disposed to be spaced apart from at a specific interval. Accordingly, the warm water that flows through the introduction opening 310 may pass through the bimetal plate 50, through the bimetal hole 500, and may be discharged into the direct-water channel 200 through the middle opening 320 and the discharge opening 330.

The bimetal plate 50 may be disposed to spaced apart from the introduction opening 310 when the temperature of the warm water is less than the reference temperature, and may close the recirculation channel while contacting the introduction opening 310 at the reference temperature or more. In detail, the bimetal plate 50 is deformed to deviate from the bimetal packing 71 that surrounds the introduction opening 310 when the temperature of the warm water is less than the reference temperature, and is deformed at the reference temperature or more to contact with the bimetal packing 71. Accordingly, the bimetal plate 50 may open the recirculation channel when the temperature of the warm water is less than the reference temperature, and may close the recirculation channel when the temperature of the warm water is the reference temperature or more.

In more detail description mainly of the deformation form of the bimetal plate 50, when the temperature of the warm water temperature is less than the reference temperature, the bimetal plate 50 may be curved in a shape that is convex from the warm-water channel 100 toward the direct-water channel 200, that is, a shape that is convex along the opposite direction to the reference direction D1. To the contrary, when the temperature of warm water is the reference temperature or more, the bimetal plate 50 may be curved in a shape that is convex from the direct-water channel 200 toward the warm-water channel 100, that is, a shape that is convex along the reference direction D1. Through the deformation for the shape, a channel, through which the warm water may flow, may be formed between the bimetal plate 50 and the introduction opening 310, or the introduction opening 310 may be closed. When the temperature of the warm water is the reference temperature or more, a center of the bimetal plate 50 becomes closer to the bimetal packing 71 to close the introduction opening 310 while contacting the bimetal packing 71.

However, the bimetal plate 50 is convex along the opposite direction to the reference direction D1 when the temperature of the warm water is less than the reference temperature, and the bimetal plate 50 is deformed into a flat plate shape that is perpendicular to the reference direction D1 at the reference temperature or more to close the recirculation channel.

In the above description, just because all the components constituting the embodiment of the present disclosure are described as being combined or operating in combination, the present disclosure is not necessarily limited to this embodiment. That is, within the scope of the purpose of the present disclosure, all of the components may operate in selective combination of one or more. In addition, terms such as "include," "comprise," or "have" described above mean that the corresponding component may be present, and thus do not exclude other components unless specifically stated to the contrary, and rather, it should be interpreted as being able to include other components. Unless defined differently, all the terms including technical or scientific terms have the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplary description of the technical spirits of the present disclosure, and an ordinary person in the art, to which the present disclosure pertains, may make various corrections and modifications without departing from the essential characteristics of the present disclosure. Therefore, the embodiments disclosed in the present disclosure are not for limiting the technical spirits of the present disclosure but for describing them, and the scope of the technical spirits of the present disclosure is not limited by the embodiments. The protection scope of the present disclosure should be construed by the following claims, and all the technical spirits in the equivalent range should be construed as being included in the scope of the present disclosure.

The invention claimed is:

1. A recirculation valve comprising:

a warm-water housing communicating with a warm-water supply tube configured to supply warm water generated by heating raw water, and defining a warm-water channel configured such that the warm water flows through an interior thereof, a direct-water housing communicating with a direct-water supply tube configured to supply direct water being the raw water, and defining a direct-water channel configured such that the direct water flows through an interior thereof;

a recirculation housing communicating with the warm-water channel and the direct-water channel, and defining a recirculation channel configured such that the warm water in the warm-water channel flows to the direct-water channel; and a water-pressure opening/closing body configured to be movable in the direct-water housing along a reference direction to close or open the recirculation channel, wherein the water-pressure opening/closing body includes an upstream pressurizing portion, and a downstream pressurizing portion located in a reference direction of the upstream pressurizing portion when a direction, in which the direct water is introduced from the direct-water supply tube into the direct-water channel, is defined as the reference direction, wherein an inner surface of the direct-water housing, which defines the direct-water channel, includes an upstream inner surface located on an outside of the upstream pressurizing portion when being disposed in a position, in which the water-pressure opening/closing body opens the recirculation channel, and a downstream inner surface located in the reference direction of the upstream inner surface, and wherein a first stepped portion located between the upstream inner surface and the downstream inner surface, the first stepped portion corresponding to a second stepped portion located between the upstream pressurizing portion and the downstream pressurizing portion.

2. The recirculation valve of claim 1, wherein a cross-sectional area of the downstream pressurizing portion, taken along a plane being perpendicular to the reference direction, is larger than a cross-sectional area of the upstream pressurizing portion.

3. The recirculation valve of claim 2, wherein the downstream pressurizing portion is located in the reference direction of the upstream inner surface in a state, in which the water-pressure opening/closing body opens the recirculation channel.

4. The recirculation valve of claim 2, wherein the water-pressure opening/closing body further includes a vortex forming portion defined by recessing an opposite side surface to the reference direction of the downstream pressurizing portion along the reference direction.

5. The recirculation valve of claim 2, wherein the water-pressure opening/closing body further includes a recessed portion defined by recessing a side surface in the reference direction of the downstream pressurizing portion along an opposite direction to the reference direction.

6. The recirculation valve of claim 5, wherein the recessed portion includes an inner recessed portion, and an outer recessed portion distinguished from the inner recessed portion and surrounding the inner recessed portion.

7. The recirculation valve of claim 1, wherein a profile of the upstream inner surface is located in a profile of the downstream inner surface when the direct-water housing is viewed in an opposite direction to the reference direction.

8. The recirculation valve of claim 7, wherein the direct-water housing includes a stopper protruding from a stepped portion inner surface configured to face the reference direction between the upstream inner surface and the downstream inner surface, along the reference direction, such that the downstream pressurizing portion contacts the stopper when the water-pressure opening/closing body opens the recirculation channel.

9. The recirculation valve of claim 1, wherein the warm-water channel is configured such that the warm water is introduced along an opposite direction to the reference direction.

10. The recirculation valve of claim 1, wherein the direct-water channel is configured such that the direct water is discharged along one direction being perpendicular to the reference direction, and wherein the warm-water channel is formed such that the warm water is discharged in a direction being parallel to a direction, in which the direct water is discharged.

11. The recirculation valve of claim 1, wherein the water-pressure opening/closing body further includes:

an opening approaching portion located in the reference direction of the downstream pressurizing portion; and a water-pressure packing coupled to the opening approaching portion while surrounding the opening approaching portion to contact a periphery of a discharge opening being a portion of the recirculation channel when the water-pressure opening/closing body closes the recirculation channel.

12. The recirculation valve of claim 1, further comprising:

a fixing frame coupled to the recirculation housing, into which the water-pressure opening/closing body is inserted along the reference direction, and located in the reference direction of the downstream pressurizing portion.

13. The recirculation valve of claim 1, wherein a discharge section of the recirculation channel is located adjacent to the water-pressure opening/closing body, the discharge section having a shape in which a cross-sectional area, taken along a plane perpendicular to the reference direction, increases along the reference direction.

14. The recirculation valve of claim 1, further comprising:

a bimetal plate deformed depending on a temperature of the warm water and configured to open and close an introduction opening being a partial section of the recirculation channel.

* * * * *